United States Patent [19]

Morino et al.

[11] Patent Number: 4,694,303
[45] Date of Patent: Sep. 15, 1987

[54] METHOD AND APPARATUS FOR PRINTING IMAGE

[75] Inventors: Tetsuro Morino; Shigeki Yamashita, both of Ebina, Japan

[73] Assignee: Fuji Xerox Co., Ltd., Tokyo, Japan

[21] Appl. No.: 824,925

[22] Filed: Jan. 31, 1986

Related U.S. Application Data

[63] Continuation of Ser. No. 611,364, May 16, 1984, abandoned.

[30] Foreign Application Priority Data

May 24, 1983 [JP] Japan .................................. 58-91130

[51] Int. Cl.$^4$ .......................................... G01D 15/16
[52] U.S. Cl. .................................. 346/1.1; 346/140 R
[58] Field of Search .................................. 346/1.1, 140

[56] References Cited

U.S. PATENT DOCUMENTS

| | | | |
|---|---|---|---|
| 2,143,376 | 1/1939 | Hansell | 346/49 |
| 3,341,859 | 9/1967 | Adams | 346/140 |
| 3,666,966 | 5/1972 | Buss | 346/140 |
| 4,166,277 | 8/1979 | Cielo | 346/140 |
| 4,205,320 | 5/1980 | Fujii | 346/1.1 |
| 4,271,416 | 6/1981 | Shimizu | 346/140 |
| 4,383,265 | 5/1983 | Kohashi | 346/140 |
| 4,575,737 | 3/1986 | Vermot-Gaud | 346/140 |

FOREIGN PATENT DOCUMENTS

| | | |
|---|---|---|
| 0046295 | 2/1982 | European Pat. Off. . |
| 167466 | 12/1981 | Japan . |
| 167468 | 12/1981 | Japan . |
| 167469 | 12/1981 | Japan . |
| 167476 | 12/1981 | Japan . |
| 1351707 | 5/1974 | United Kingdom . |
| 1484368 | 9/1977 | United Kingdom . |
| 2001284A | 1/1979 | United Kingdom . |

*Primary Examiner*—Joseph W. Hartary
*Attorney, Agent, or Firm*—Spensley Horn Jubas & Lubitz

[57] ABSTRACT

In printing images, desired portions of surface of ink are risen by utilizing electrostatic force (Coulomb force), whereby the ink is transferred onto a printing medium placed adjacent to the ink surface. In order to rise the desired portions of the ink level, a printing apparatus has such construction that a plurality of printing electrodes are provided in such a way that the end portions thereof are positioned slightly below the ink surface level, while an auxiliary electrode is disposed opposite to the printing electrodes over the ink surface.

6 Claims, 5 Drawing Figures

METHOD AND APPARATUS FOR PRINTING IMAGE

BACKGROUND OF THE INVENTION

1. Field of the Invention

This invention relates to method and apparatus for printing images, and more particularly to method and apparatus for printing images wherein the level of ink surface is risen by means of Coulomb force, whereby the ink is allowed to transfer onto printing paper to print the images.

2. Description of the Prior Art

An ink jet printing method has heretofore been known as a printing method of type wherein ink is caused to transfer onto printing paper thereby printing images. In such ink jet printing method, printing of images is effected by controlling ink drops jetted from an ink nozzle. This method has widely been used because images can be printed on ordinary papers. The ink jet printing method is constructed such that principal scanning is carried out by either deflecting ink drops or moving the nozzle. However, in such a case where 1 m/sec or more high-speed scanning is performed as required in facsimiles, plotters or the like, it is difficult in general to scan ink jet at such a high speed. For this reason, such a method has been adopted in which principal scanning is performed by means of cylindrical scanning and auxiliary scanning is performed by moving the nozzle when high speed scanning is required. However, the method utilizing the cylindrical scanning has defects in mounting and removal of printing papers, operation reliability, etc. so that such problems as described above remain unsolved when image printing with high pecision is required.

In this connection, Japanese Patent Laid-open Nos. 161933/1979 and 4467/1981 disclose an image printing apparatus employing a slit-jet method wherein ink is transferred directly onto ordinary papers by means of flat scanning thereby to reproduce images on the papers. This type of apparatus is constructed such that an ink nozzle whose opening is slit shaped is provided along the whole width in its scanning direction, a plurality of electrodes are juxtaposed inside the nozzle thereby forming a printing head, and ink jetted from the ink nozzle is controlled by selectively applying voltage to these electrodes. In forming such printing head, nozzle opening should be formed into a slit-shape and in addition, a plurality of electrodes should be disposed in the vicinity of the nozzle opening. In fabricating these electrodes, either a PWB (Printing Wiring Board) process utilizing etching technique or a process wherein a thin metal wires are uniformly juxtaposed to the portions where the electrodes are to be formed is used.

In the PWB process, however, it is difficult to form wide electrodes along the principal scanning direction, besides the electrodes formed by photoetching corroded easily. Further, it is difficult to uniformly dispose metal wires with an equal distance when the latter process is employed so that it has been a cause for deterioration of printing quality. In addition, since a plurality of electrodes are juxtaposed to each other with a small distance in the slit-jet method, there have been such problems that if conductive foreign substances are included in ink, there is a fear of short-circuiting of the electrodes, and further that if the ink existing between electrodes hardens, such hardened ink is difficult to remove.

SUMMARY OF THE INVENTION

Accordingly, it is an object of the present invention to provide a method and apparatus for printing images by which the above-mentioned problems can be solved.

According to an embodiment of the present invention, a multiple-stylus is constructed by arranging a plurality of styli in line as printing electrodes and submerging the printing electrodes such that each end portion thereof is slightly below the level of ink surface, an auxiliary electrode is located over the surface the ink so as to confront these printing electrodes, signals whose voltage correspond to each image element to be printed are applied across the printing electrodes and the auxiliary electrode so that desired portions of the ink surface are risen by means of electrostatic force (Coulomb force). Thus, the ink is transferred onto a printing medium disposed adjacent to the ink surface so that the desired image is reproduced on the printing medium.

DESCRIPTION OF THE PREFERRED EMBODIMENTS

Figure 1:
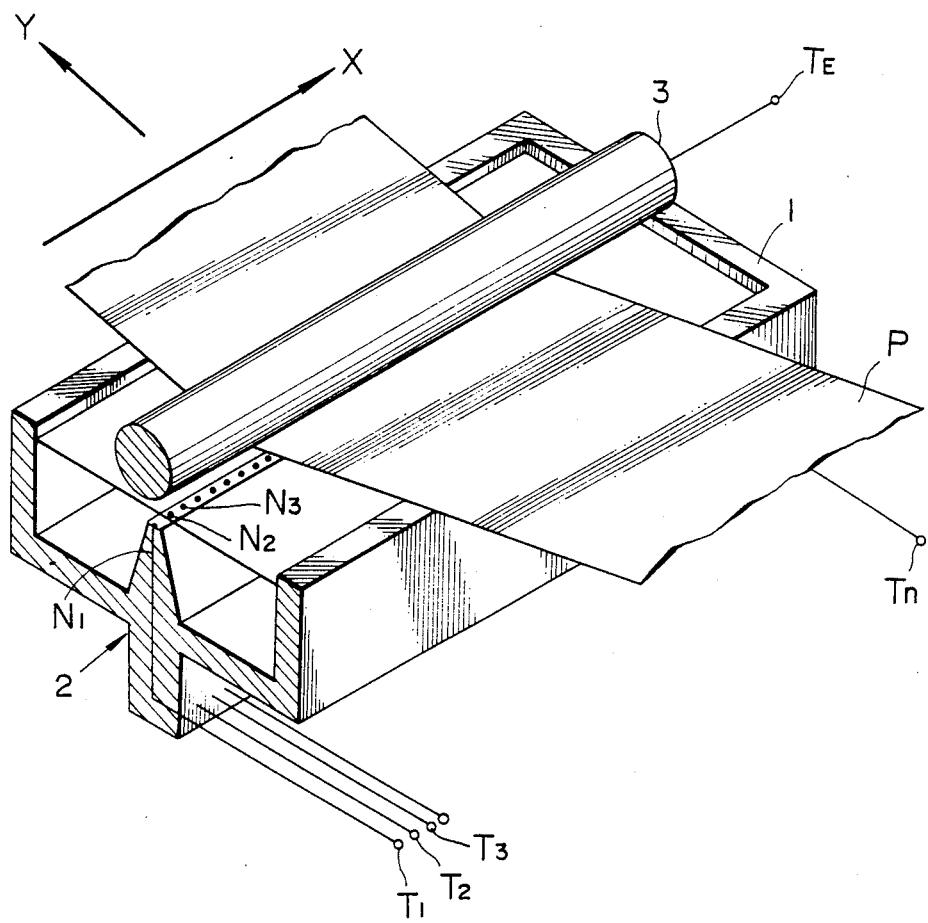
FIG. 1 is a partially cutaway perspective view of an embodiment of the image printing apparatus according to the present invention.
Figure 2:
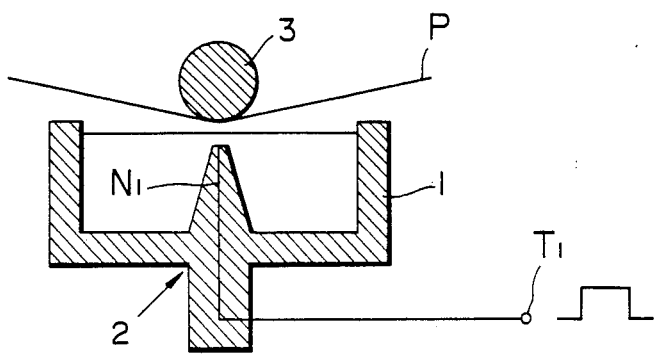
FIG. 2 is a sectional view viewed from the cutaway side of FIG. 1.

Referring to FIGS. 1 and 2, a multiple-stylus 2 is provided with a plurality of printing electrodes $N_1$ to $N_n$ along the principal scanning direction X. As is clearly shown and evident in all the figures, the end of each printing electrode or stylus terminates substantially coplanarly with the top of the insulation block. Also clearly evident from all the figures, the multiple stylus 2 is integrally constructed with and disposed in the central bottom part of an ink container 1, as is clearly shown and evident in all the figures, and divides the ink container into two longitudinal troughs, one on each side of the line of printing electrodes. As made evident by FIGS. 1 and 2, both troughs are filled with ink to be transferred onto a printing paper P. The end portion of the multiple stylus 2 is positioned slightly below the level of ink surface. To the printing electrodes $N_1$ to $N_n$ of the multiple-stylus 2, a picture signal corresponding to an original image is applied in its principal scanning direction through terminals $T_1$ to $T_n$. A cylindrical auxiliary electrode 3 having a width extending over the principal scanning direction X is disposed slightly above the ink level and confronting the multiple-stylus 2. The auxiliary electrode 3 is grounded through an earth terminal $T_E$.

The operation of the image printing apparatus according to the present invention will now be described hereinbelow.

Means for translating a printing medium relative to the line of printing electrodes is used to transfer the paper P along its auxiliary scanning direction Y while the picture signal corresponding to the image is applied to the printing electrodes $N_1$ to $N_n$. The level of the ink surface positioned over the printing electrodes is risen by means of electrostatic force (Coulomb force) so that the ink thus risen is transferred onto the paper P, whereby the image is reproduced on the paper P. This is because ink has a higher dielectric constant compared with air and force attracting ink to air is produced when electric field is applied perpendicularly to the interfacial boundary between the ink and air. At the completion of a line of printing, the paper P is again transferred along the Y direction through means for translating a paper medium.

Figure 4:
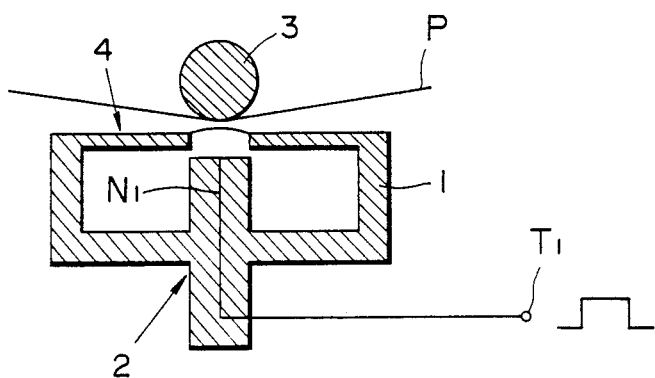
FIG. 4 is a sectional view viewed from the cutaway side of FIG. 3.
Figure 3:
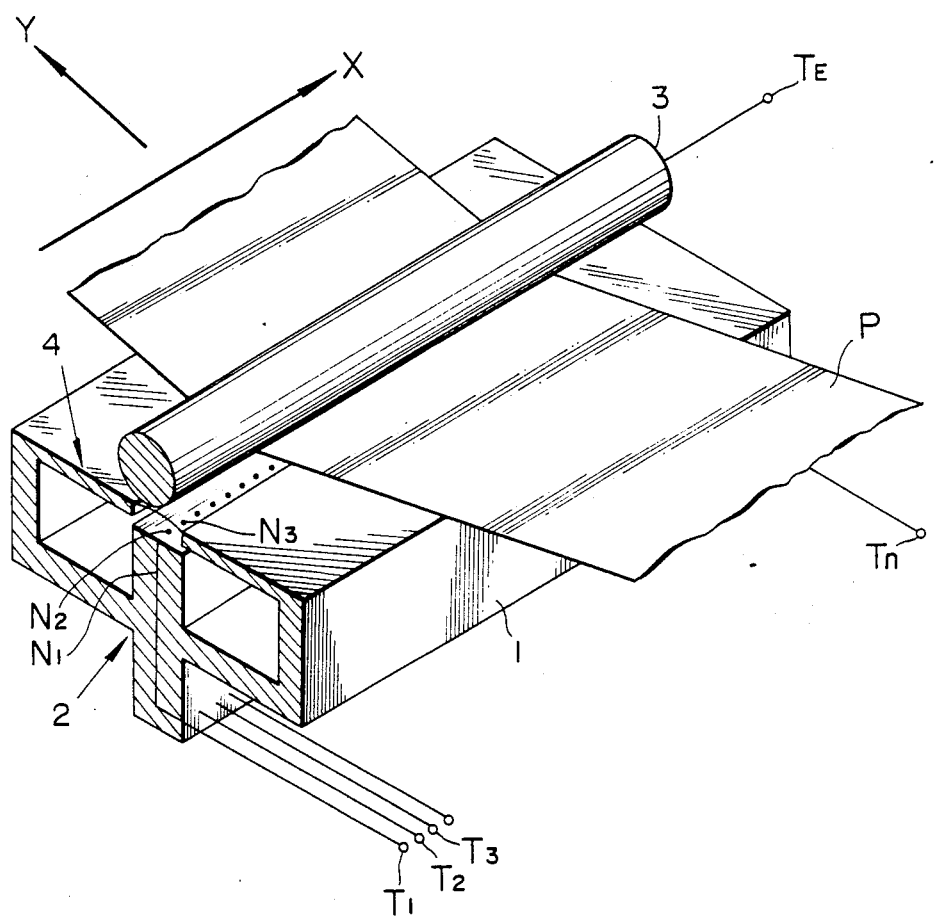
FIG. 3 is a partially cutaway perspective view of another embodiment of the image printing apparatus according to the present invention.

FIG. 3 is a partially cutaway perspective view of another embodiment of the printer according to the present invention, and FIG. 4 is a sectional view viewed from the cutaway side of FIG. 3 wherein like parts are shown by corresponding reference numerals and characters in FIGS. 1 and 2, and the explanation relating thereto is omitted.

In this embodiment, the surface of ink contained in an ink container 1 is covered with a panel 4 having a slit at a part corresponding to end portion of a multiple-stylus 2 so that the ink forms meniscus at the slit portion.

In operation of the printer of the present embodiment, a paper P is transferred along auxiliary scanning direction Y while a picture signal is applied to printing electrodes $N_1$ to $N_n$ through terminals $T_1$ to $T_n$. The ink forming the meniscus over the printing electrodes to which voltage of the picture signal is applied is risen by means of electrostatic force so that the ink is transferred onto the paper P, whereby a visible image is formed on the paper P.

It is to be noted that the shape of the end portion of the multiple-stylus 2 is not limited to that shown in the drawings of above embodiments, but any shape may be adopted so far as the level of ink surface can be risen at the time when a picture signal voltage corresponding to an original image is applied.

Figure 5:
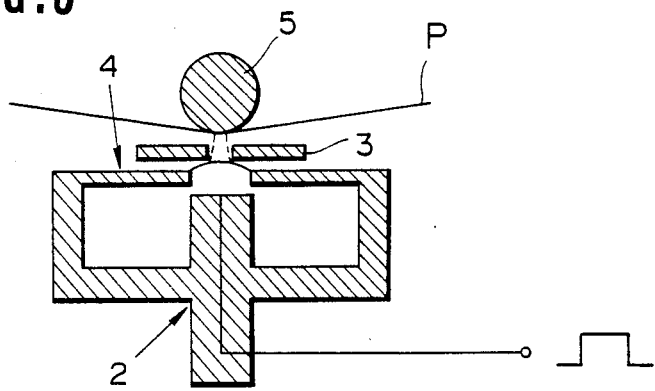
FIG. 5 is a sectional view illustrating a further embodiment of the present invention.

Moreover, although the present embodiment is constructed such that the auxiliary electrode is formed into a cylindrical shape, and ink is allowed to transfer onto the paper positioned between the auxiliary electrode and the multiple-stylus, the construction of the apparatus of the present invention is not limited to those described above, and such construction, for example, as shown in FIG. 5, that the auxiliary electrode 3 is formed into a flat plate shape disposed between printing paper P and the panel 4, openings for passing the ink therethrough are defined at portions corresponding to the printing electrodes of the multiple-stylus 2 and a supporting roller 5 for supporting the paper P is provided separately from the auxiliary electrode 3 may also be adopted.

In addition, the auxiliary electrode is not necessarily grounded, but the picture signal to be applied to the printing electrodes whose polarity is inverted may also be applied to the auxiliary electrode.

What is claimed is:

1. A method for use in a printing apparatus for image printing, comprising the steps of:
   submerging in ink a continuous uniform block of insulation material containing printing electrodes which are formed by linearly arranging and closely and uniformly spacing a plurality of styli in a line so that the end portions of said styli, which terminate substantially coplanarly with the top of said insulation block, are slightly below an ink surface, said block having no coplanar electric field producing electrodes; said submerging step further including the step of placing on said ink surface a covering containing an elongated opening, said ink surface forming a meniscus at said opening, said opening traversing the entire line of said printing electrodes;
   confronting said printing electrodes by an auxiliary electrode opposite to said printing electrodes and slightly above said ink surface; and
   raising the level of desired portions of said ink surface, without the use of electroosmotic force, by applying a voltage across said printing electrodes and said auxiliary electrode in accordance with information of an image to be printed so as to print onto a printing medium disposed slightly above said ink surface, which is sufficiently close so that upon applying said voltage said risen ink touches the paper medium, wherein said image is printed on said printing medium with said ink.

2. An apparatus for image printing, the apparatus comprising:
   a uniform block of insulation material containing a plurality of closely and uniformly spaced printing electrode styli arranged in a line, which styli terminate substantially coplanarly with the top of said insulation block, said block having no coplanar electric field producing electrodes;
   an auxiliary electrode in spaced confronting relationship to said printing electrodes;
   an ink container having a panel, said container being situated so that ink within said container bridges said printing electrodes to form a ink surface between said printing electrodes and said auxiliary electrode, the surface of said ink being covered by said panel which defines an elongated slit where said printing electrodes confront said auxiliary electrode so that the ink surface forms a meniscus along said slit; and
   means for raising the level of desired portions of said ink surface without the use of electroosmotic force, which includes means for applying voltage across said printing electrodes and said auxiliary electrode in accordance with information to be printed so as to print onto a printing medium disposed slightly above said ink surface, which is sufficiently close so that upon applying said voltage said risen ink touches the paper medium, wherein said image is printed on said printing medium with said ink.

3. An apparatus for image printing as claimed in claim 2 wherein said printing electrodes are centrally located under said slit.

4. An apparatus for image printing as claimed in claim 2 wherein said auxiliary electrode is cylindrical and said printing medium is placed to abut upon said auxiliary electrode confronting said printing electrodes.

5. An apparatus for image printing as claimed in claim 2 wherein said auxiliary electrode is a flat plate provided with openings at portions corresponding to said printing electrodes, and said printing medium is placed on the reverse side of said auxiliary electrode with respect to said printing electrodes.

6. An apparatus for image printing as claimed in claim 2 wherein said meniscus is formed without the use of voltage.

* * * * *